No. 720,420. PATENTED FEB. 10, 1903.
LE ROY C. GILLESPIE.
COMBINED FERTILIZER DISTRIBUTER AND CORN PLANTER.
APPLICATION FILED DEC. 13, 1902.
NO MODEL. 2 SHEETS—SHEET 1.

Witnesses
Edwin G. McKee
Chas. S. Hyer

Inventor
LeRoy C. Gillespie
By Victor J. Evans.
Attorney

No. 720,420. PATENTED FEB. 10, 1903.
LE ROY C. GILLESPIE.
COMBINED FERTILIZER DISTRIBUTER AND CORN PLANTER.
APPLICATION FILED DEC. 13, 1902.
NO MODEL. 2 SHEETS—SHEET 2.
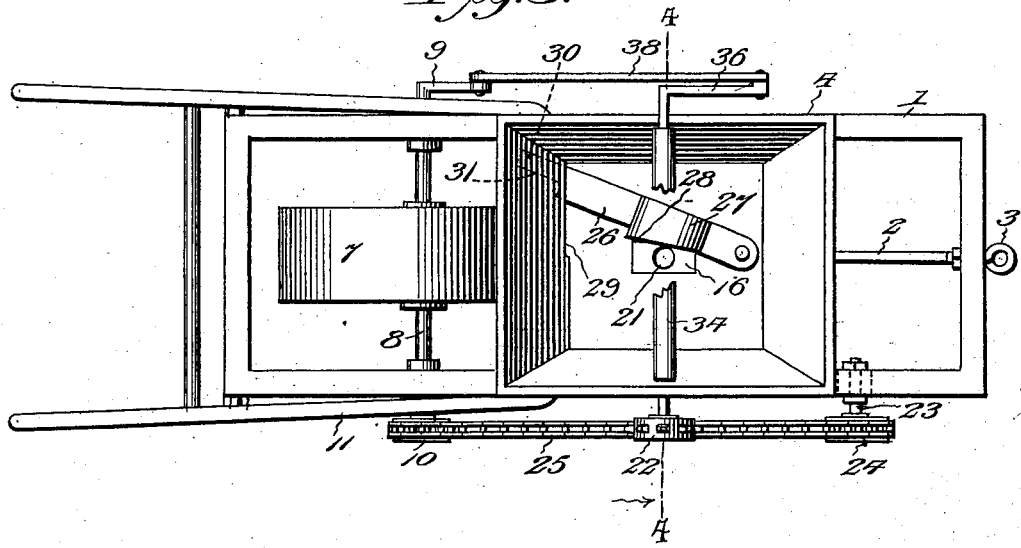
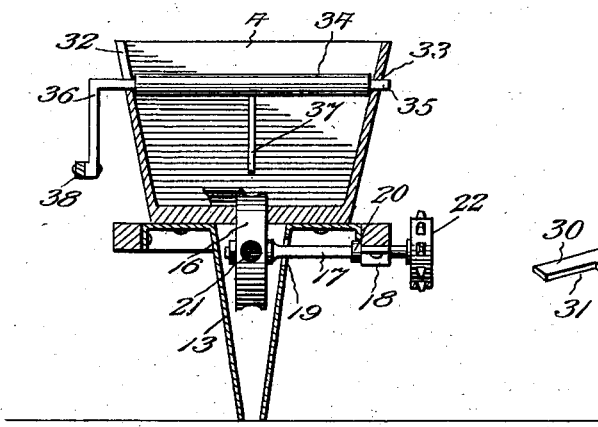
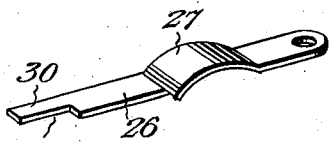

UNITED STATES PATENT OFFICE.

LE ROY C. GILLESPIE, OF BROWNSVILLE, TENNESSEE.

COMBINED FERTILIZER-DISTRIBUTER AND CORN-PLANTER.

SPECIFICATION forming part of Letters Patent No. 720,420, dated February 10, 1903.

Application filed December 13, 1902. Serial No. 135,155. (No model.)

*To all whom it may concern:*

Be it known that I, LE ROY C. GILLESPIE, a citizen of the United States, residing at Brownsville, in the county of Haywood and State of Tennessee, have invented new and useful Improvements in a Combined Fertilizer-Distributer and Corn-Planter, of which the following is a specification.

This invention relates to a combined fertilizer-distributer and corn-planter; and the purpose of the same is to provide a simple and effective arrangement of elements so applied in operative relation that a portion of the same may be detached and removed to convert the improved device from a fertilizer-distributer into a corn-planter without detracting from the effectiveness of the machine in either condition, and thereby materially reduce the cost of agricultural machines by having one complete organization capable of use either as a fertilizer-distributer or corn-planter by a simple change of parts not requiring mechanical skill and readily understood by any one.

The invention consists in the construction and arrangement of the several parts, which will be more fully hereinafter described and claimed.

Figure 1:
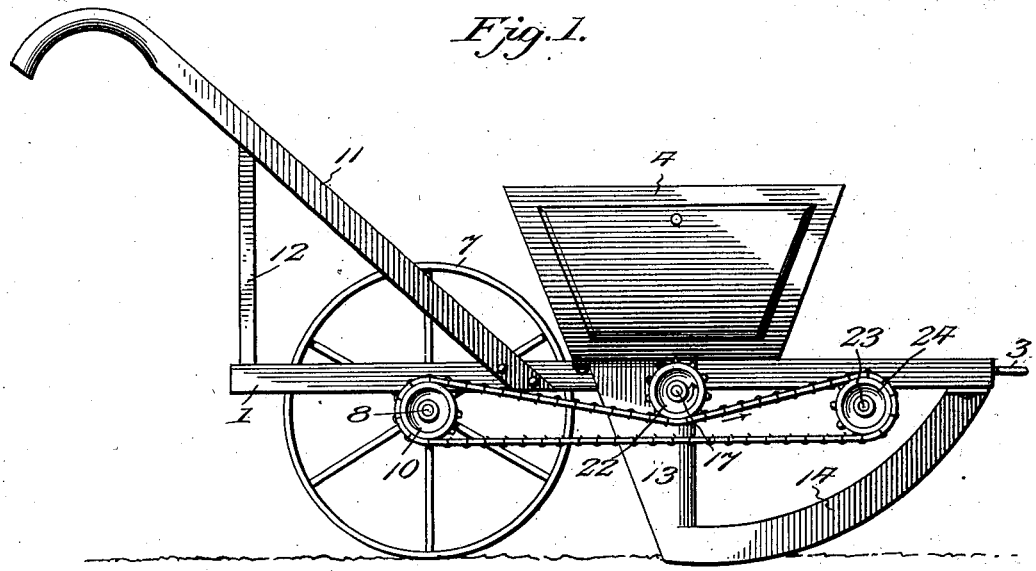
Figure 2:
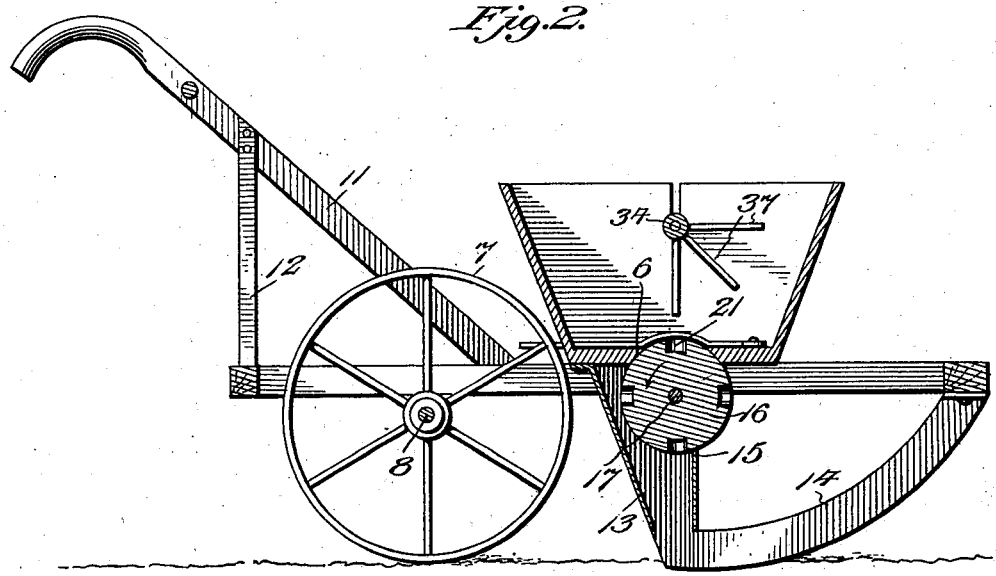

In the drawings, Figure 1 is a side elevation of a machine embodying the features of the invention. Fig. 2 is a longitudinal vertical section of the same. Fig. 3 is a top plan view thereof. Fig. 4 is a transverse vertical section taken in the plane of the line 4 4, Fig. 3. Fig. 5 is a detail perspective view of a cut-off slide used in regulating the outflow of the fertilizer or deposit of the seed from the hopper.

Similar numerals of reference are employed to indicate corresponding parts in the several views.

The numeral 1 designates a frame which in the present instance is rectangular in form, and connecting with the front extremity thereof is a draft-bar 2, having an eye or other analogous device 3 in advance of the front end of the frame for the attachment thereto of draft devices. A hopper 4 is secured on the frame 1, and in the bottom 5 thereof is an outlet-opening 6, preferably located at the longitudinal center thereof. In rear of the hopper 4 a broad-tread carrying-wheel 7 is mounted on a rotatable drive shaft or axle 8, the wheel being disposed centrally in relation to the side bars of the frame and the ends of the shaft or axle projected beyond the said bars. On one end of the shaft or axle is a crank 9, and on the opposite end a sprocket-wheel 10 is secured. As a means for conveniently directing the movement of the machine over the ground-surface handle-bars 11 are secured to the side bars of the frame at a suitable point and project upwardly at an angle of inclination and terminate in rear of the rear end of the frame 1, suitable braces 12 being attached to the handle-bars and the adjacent portions of the frame below. Below the hopper a spout 13 depends and continues into a furrow-opener 14, which curves upwardly and connects to the front central portion of the frame 1. The spout 13 has the upper portion thereof bent at an angle and secured to the bottom of the hopper and the side bars of the frame 1, and in the front portion thereof is a slot or opening 15 to accommodate the rotation of a rotary feed-disk 16, which is vertically disposed and suitably keyed on a shaft 17, journaled in a bearing-box 18, secured to the under side of one of the side bars of the frame 1. The shaft 17 projects through an opening 19 in the spout 13, and on the inner extremity of said shaft the disk 16 is mounted and centrally held by a stop-collar 20 thereon firmly bearing against the inner side of the box 18. The disk 16 is formed with a series of pockets 21, and in operation the said disk rotates in the slot 6 in the bottom of the hopper 4, the said slot being just large enough to permit the rotation of the disk therein without permitting the fertilizer or corn in the hopper from escaping through any part of the slot. On the outer end of the shaft 17 a sprocket-wheel 22 is keyed and alined with the sprocket-wheel 10 on the shaft 8. In advance of the hopper 4 and secured to one of the side bars of the frame 1 is a stub-shaft 23, on which an idler-sprocket 24 is rotatably mounted, and surrounding the sprocket 10, passing under the sprocket 22, and surrounding the sprocket 24 is a chain belt 25, by means of which motion is conveyed from the shaft 8 to the shaft 17. As the machine is propelled or drawn forwardly over the ground-surface the shaft or axle 8 is rotated and through the mechanism just described the disk 16 is correspondingly actuated to bring successive pockets up through the bottom of the hopper 4 to receive either fertilizer or corn or other seed. In some instances it may be desired to substitute one disk for another having pockets of different size to adapt the machine for use in planting different kinds of seed or in distributing fertilizer in different quantities, and it will be understood that a number of disks may be used and will be furnished in connection with the machine in some makes of the same, but ordinarily one disk will suffice for general usage.

The feed of the fertilizer or seed from the hopper 4 can be controlled at will through the medium of a cut-off slide 26, pivoted at its front end to the center of the bottom of the hopper in advance of the slot 6 and having an arcuate member 27 to fit over the portion of the disk 16 which projects upwardly through the bottom of the hopper. One edge of the arcuate member 27 is formed at an angle of inclination, as at 28, to adapt the slide to clear the pockets of the disk without requiring too great lateral movement of said slide to arrive at this result. The rear extremity of the slide is movable through a slot 29 in the rear wall of the hopper, close to the bottom of the latter, and has a projecting handle 30 within convenient reaching distance of the operator, the said handle being cut away, as at 31, to avoid engagement or interference with the wheel 7 when the slide is closed.

The upper portion of one side of the hopper 4 has a vertical slot 32, opening out through the upper edge thereof and having its lower terminal wall in line with an opening 33 diametrically opposite in the other side wall of the hopper. In this slot and opening 33 an agitator is removably mounted and comprises a rock shaft or bar 34, with a trunnion 35 at one end, removably fitted in the opening 33, and a crank 36 at the opposite end, freely withdrawable from and insertible in the slot 32. Extending downwardly from the rock shaft or bar 34 are a series of radial agitator-arms 37, which depend over the disk 16, and as the shaft or bar 34 is oscillated the arms 37 prevent the fertilizer from clogging over the said disk. Connected to the crank 36 and the crank 9 is a pitman or driving rod 38, the fastening devices between the opposite ends of said pitman or driving rod and the cranks being freely removable, so that the agitator, with its coöperating parts, may be withdrawn from the hopper when the machine is used for planting purposes. The crank 36 is materially longer than the crank 9, and, in fact, said crank is so proportioned that a revolution of the crank 9 will cause an oscillation of the crank 36, and by this means the arms 37 are always retained in the fertilizer.

As will now be understood, when the machine is used as a fertilizer-distributer the agitator will be disposed in the hopper, as shown, and connected to the crank 9 by the pitman 38, and during the propulsion of the machine or the movement thereof over the ground-surface after the slide 26 has been opened the fertilizer will be regularly distributed by the disk 16 through the hopper 13 over the ground-surface or in the furrow formed by the furrow-opener 14. In planting the agitator and its coöperating parts are withdrawn from the hopper and the seed desired to be deposited is placed in the hopper 4 and through the medium of the disk 16 is regularly dropped through the spout 13 into the furrow formed by the furrow-opener 14. The carrying-wheel 7 not only provides a stable supporting means for the machine as an entirety, but also serves as a furrow-coverer by reason of the location thereof in the center of the machine behind the spout and in longitudinal alinement with the furrow-opener.

The improved machine will be found exceptionally useful for the purpose for which it has been devised, and changes in the proportions and dimensions thereof, as well as the minor details, may be resorted to without departing from the spirit of the invention.

Having thus fully described the invention, what is claimed as new is—

1. In a machine of the class set forth, the combination of a frame, an axle rotatably secured to the frame, a carrying-wheel mounted on the axle on the center of the frame, a hopper mounted on the frame in advance of the carrying-wheel and having a slot in the bottom thereof, a spout secured to the bottom of the hopper and continuing into a forwardly-projecting furrow-opener, a shaft projecting transversely into the spout and having a disk thereon rising through the slot in the bottom of the hopper, the said disk being formed with pockets, means for operating the said shaft and disk from the axle, and an agitator removably mounted in the hopper and detachably connected to said axle.

2. In a machine of the class set forth, the combination of a frame, a hopper supported thereon, a spout depending from the hopper and continuing into a furrow-opener, a feed-disk rotatably mounted at the bottom portion of the hopper and exposed through the latter, a slide pivoted at its front end to the hopper and having an arcuate member to cover a portion of the disk, one side edge of the member being inclined to vary the width of the said member from its front to its rear extremity, and a carrying-wheel attatched to the frame.

In testimony whereof I affix my signature in presence of two witnesses.

LE ROY C. GILLESPIE.

Witnesses:
H. H. DICKINSON,
R. G. EVANS.